(12) United States Patent
Eldredge

(10) Patent No.: US 6,782,616 B2
(45) Date of Patent: Aug. 31, 2004

(54) CONNECTION ARRANGEMENTS FOR ELECTRICAL DEVICES

(75) Inventor: Kenneth J. Eldredge, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 89 days.

(21) Appl. No.: 09/759,952

(22) Filed: Jan. 12, 2001

(65) Prior Publication Data

US 2002/0093800 A1 Jul. 18, 2002

(51) Int. Cl.[7] .............................................. H05K 13/00
(52) U.S. Cl. .................... 29/854; 29/832; 29/834; 29/835; 29/837; 29/840; 228/180.21; 228/180.22; 228/180.5
(58) Field of Search ............................ 29/854, 832, 834, 29/835, 837–840, 842, 843, 850; 228/180.21, 180.22, 180.5

(56) References Cited

U.S. PATENT DOCUMENTS

| | | | | |
|---|---|---|---|---|
| 3,663,224 A | * | 5/1972 | Hallman et al. | 250/492.1 |
| 3,698,074 A | * | 10/1972 | Helda et al. | 174/52.4 |
| 5,501,003 A | * | 3/1996 | Bernstein | 29/827 |
| 5,544,412 A | * | 8/1996 | Romero et al. | 29/832 |
| 5,625,935 A | * | 5/1997 | Kubota et al. | 29/25.42 |
| 5,777,610 A | * | 7/1998 | Sugimoto et al. | 29/854 |
| 2001/0054233 A1 | * | 12/2001 | Hamatani et al. | 29/854 |

* cited by examiner

Primary Examiner—David P. Bryant
Assistant Examiner—Stephen Kenny

(57) ABSTRACT

The present disclosure relates to connection arrangements for electrical devices. In the connection arrangements, an electrical device having at least one ledge that includes a plurality of contact terminals provided thereon is electrically connected to an electrical component having a plurality of contacts formed thereon.

8 Claims, 7 Drawing Sheets

CONNECTION ARRANGEMENTS FOR ELECTRICAL DEVICES

FIELD OF THE INVENTION

The present disclosure relates to connection arrangements for electrical devices. More particularly, the disclosure relates to mounting arrangements for multilayered electrical devices.

BACKGROUND OF THE INVENTION

Electrical devices can comprise several different layers. An example of one such device is the atomic resolution storage (ARS) device. ARS devices can include several different semiconductor layers or dies that are connected to each other in a stacked arrangement. For instance, an ARS device can comprise a top die, a middle die, and a bottom die. In such an arrangement, the top and bottom layers can each comprise an active layer that faces inwardly toward the middle layer. The middle layer can comprise two active layers formed on opposing sides that face outwardly toward the top and bottom layers, respectively.

In one presently contemplated arrangement, the top layer of the ARS device has a smaller surface area than that of the middle layer so as to form a recess or ledge long at least one of the sides of the device. Where the middle layer is provided with an active layer that faces the top layer, contact terminals can be provided along the ledge which can be used to connect the ARS device to another electrical component such as a printed circuit board (PCB).

Despite the advantages realizable with the increased storage capacity of new memory devices such as ARS devices, electrical connection to these devices can create assembly problems. For instance, where, as described above, the contact terminals of the memory device are formed on a recess or ledge, it can be difficult to make electrical connection to the device in that the terminals are not easily accessible.

From the foregoing, it can be appreciated that it would be desirable to have connection arrangements that facilitate electrical connection of electrical devices having contact terminals disposed in a difficult to access area of the electrical device.

SUMMARY OF THE INVENTION

The present disclosure relates to connection arrangements for electrical devices. In the connection arrangements, an electrical device having at least one ledge that includes a plurality of contact terminals provided thereon is electrically connected to an electrical component having a plurality of contacts formed thereon.

In one embodiment, at least one contact terminal of the electrical device is electrically connected to at least one contact of the electrical component with a conductor. In another embodiment, the electrical component comprises a cavity that is sized and configured to receive a portion of the electrical device such that the contact terminals are arranged in direct opposition to the contacts of the electrical component when the electrical device is disposed within the cavity.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
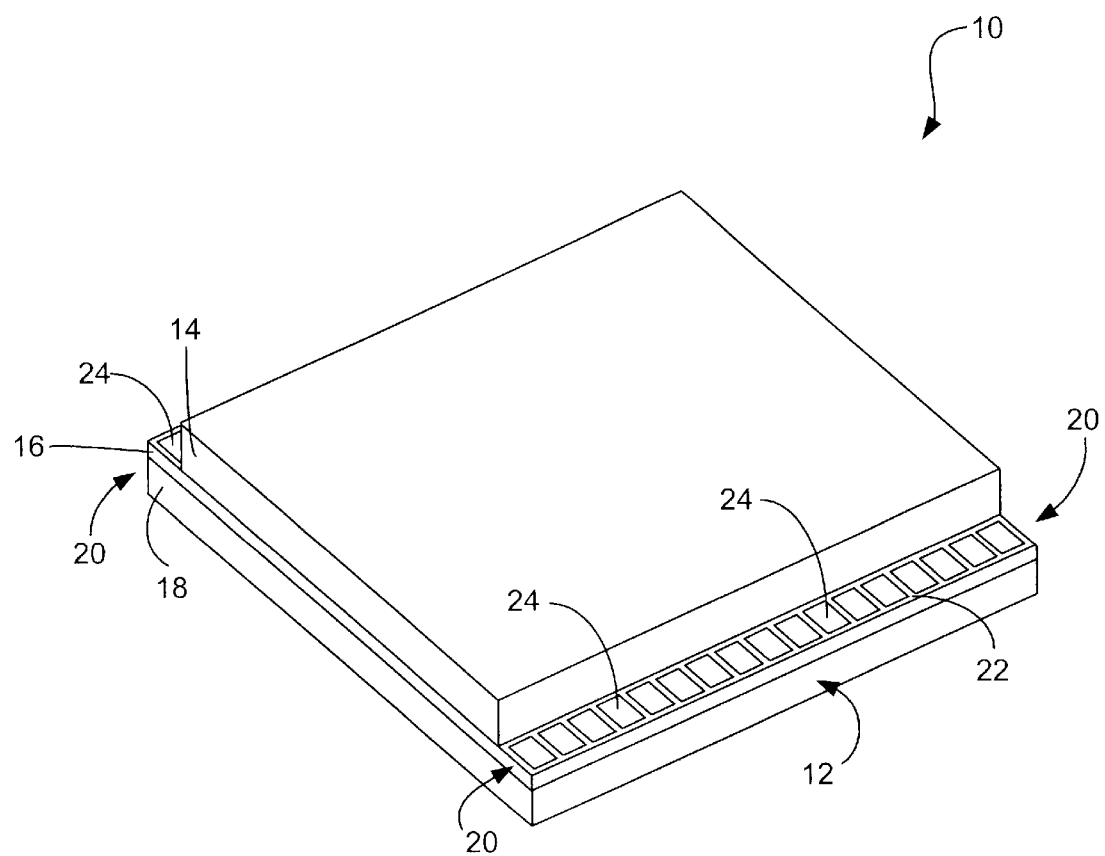
FIG. 1 is a perspective view of an example electrical device.

Referring now in more detail to the drawings, in which like numerals indicate corresponding parts throughout the several views, FIG. 1 illustrates an example electrical device 10 that is to be electrically connected to another electrical component such as a printed circuit board (PCB). As indicated in this figure, the electrical device 10 typically comprises a plurality of semiconductor layers or dies 12 that are connected to each other in a stacked configuration. By way of example, the electrical device 10 can comprise a first or top layer 14, a second or middle layer 16, and a third or bottom layer 18.

As illustrated in FIG. 1, one of the outer layers of the device 10 normally is smaller in area than one or more of the remaining layers. In the arrangement shown in FIG. 1, for instance, the top layer 14 is smaller in area than the middle and bottom layers 16 and 18 such that recesses or ledges 20 are formed on opposed sides of the device 10. Although two such ledges 20 are illustrated in FIG. 1, it is to be understood that a fewer or greater number of ledges can be formed depending upon the relative sizes of the layers and the manner in which they are oriented relative to each other. By way of example, the top layer 14 can be approximately 500 microns ($\mu$m) thick such that the ledges 20 are formed approximately 500 $\mu$m from the top surface of the device 10.

As described above, the middle layer 16 can include two active layers 22 (only one visible in FIG. 1) that are formed on opposed sides of the layer. Due to the existence of these active layers 22, a plurality of contact terminals 24 can be provided on the ledges 20. Although sixteen such terminals 24 are shown in FIG. 1, it is to be understood that substantially any number of terminals can be provided depending upon the particular configuration of the electrical device 10.

Figure 2A:
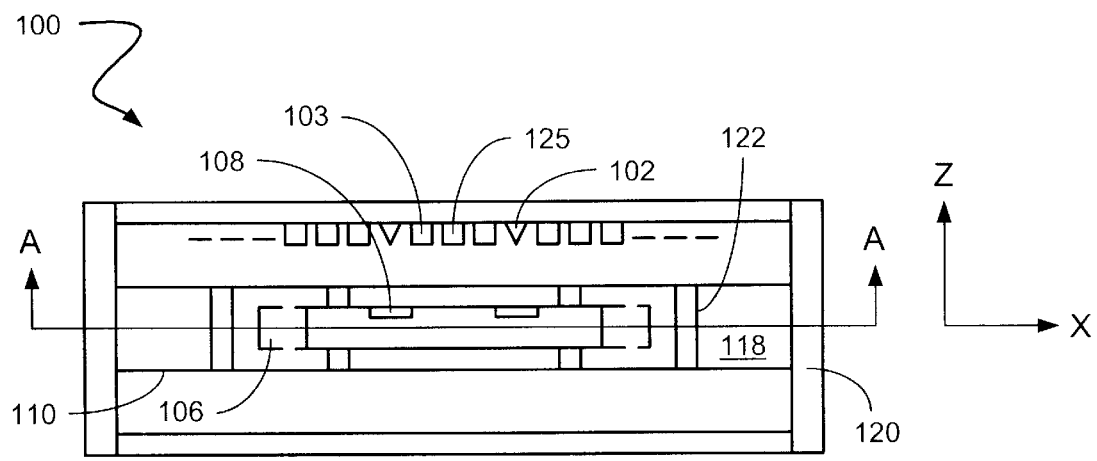
FIGS. 2A–2C are various views of the internal structure of an ARS device that can comprise the electrical device of FIG. 1.
Figure 3:
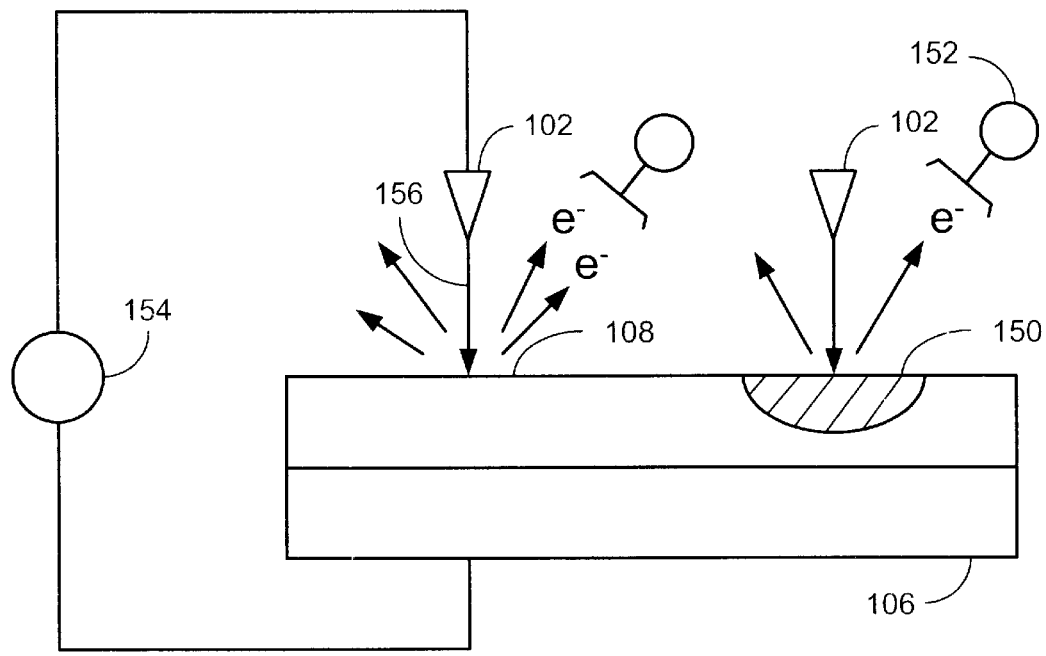
FIG. 3 is a schematic view illustrating field emitters reading from storage areas of an ARS device.
Figure 4:
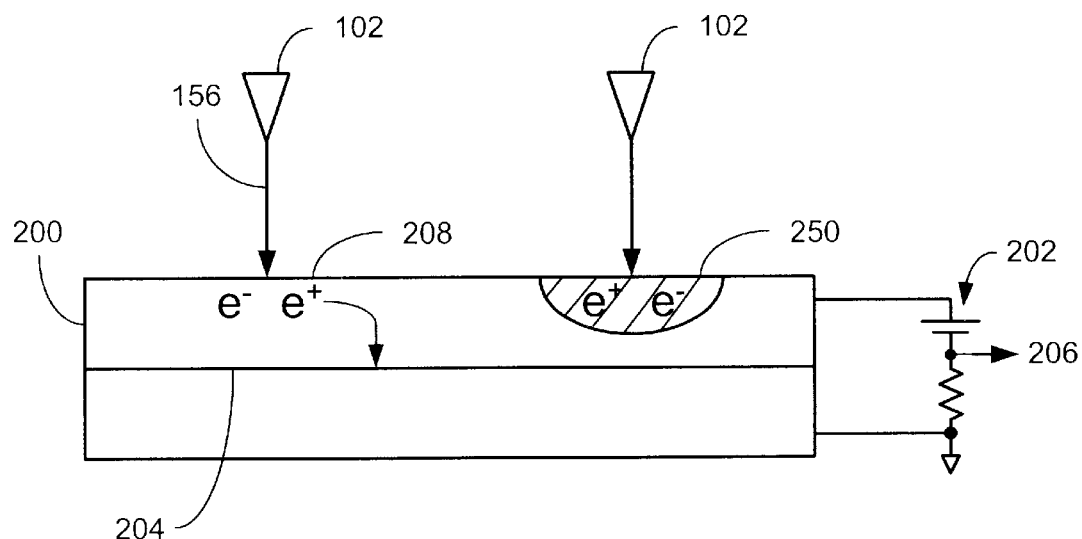
FIG. 4 is a schematic view illustrating a storage medium of an ARS device.

Although the electrical device 10 can comprise substantially any solid-state device, the electrical device preferably comprises an atomic resolution storage (ARS) device. FIGS. 2–4 illustrate the internal structure of an ARS device 100 suitable for construction of the electrical device 10 described above. The ARS device 100 shown in these figures is disclosed and described in detail in U.S. Pat. No. 5,557,596, which is hereby incorporated by reference into the present disclosure. FIG. 2A shows a side cross-sectional view of the ARS device 100. As indicated in this figure, the device 100 includes a number of field emitters 102, a storage medium 106 having a number of storage areas 108, and a micromover 110 which scans the storage medium 106 with respect to the field emitters 102 or vice versa. In a preferred embodiment, each storage area 108 is responsible for storing one bit of information. Typically, the field emitters 102 are point-emitters having very sharp tips, each tip having a radius of curvature of approximately one nanometer to hundreds of nanometers.

During operation, a predetermined potential difference is applied between a field emitter 102 and a corresponding gate such as a circular gate 103 which surrounds it. Due to the sharp tip of the emitter 102, an electron beam current is extracted from the emitter 102 towards the storage area 108. Depending upon the distance between the emitters 102 and the storage medium 106, the type of emitters 102, and the spot size (e.g., bit size) required, electron optics may be useful in focusing the electron beams. Voltage may also be applied to the storage medium 106 to either accelerate or decelerate the field's emitted electrons or to aid in focusing the field emitted electrons. In a preferred embodiment, a casing 120 maintains the storage medium 106 in a partial vacuum, such as at least $10^{-5}$ torr.

In the embodiment shown in FIG. 2A, each field emitter 102 is associated with a corresponding storage area 108. As the micromover 110 scans the medium 106 to different locations, each emitter 102 is positioned above different storage areas. With the micromover 110, an array of field emitters 102 can scan over the storage medium 106. The field emitters 102 are responsible for reading and writing information on the storage areas 108 by means of the electron beams they produce. Thus, the field emitters 102 are preferably of the type that produce electron beams which are narrow enough to achieve the desired bit density of the storage medium 106, and which provide the power density of the beam current needed for reading from and writing to the medium 106. A variety of methods are known in the art which are suitable for making such field emitters 102.

In a preferred embodiment, there can be a two-dimensional array of emitters 102, such as 100 by 100 emitters with an emitter pitch of 15 micrometers in both the X and Y directions. Each emitter 102 may access bits in tens of thousands to hundreds of millions of storage areas 108. For example, the emitters 102 can scan over the storage medium 106 (which has a two-dimensional array of storage areas 108) with a periodicity of approximately 1 to 100 manometers between any two storage areas 108 and the range of the micromover is 15 micrometers. In addition, each of the emitters 102 may be addressed simultaneously or in a multiplexed manner. Such a parallel accessing scheme significantly reduces access time and increases data rate of the storage device 14.

A preferred micromover 110 can be made in a variety of ways as long as the micromover 110 has sufficient range and resolution to position the field emitters 102 over the storage areas 108. As a conceptual example, the micromover 110 can be fabricated by a standard semiconductor microfabrication process to scan the medium 106 in the X and Y directions with respect to the casing 120.

Figure 2B:
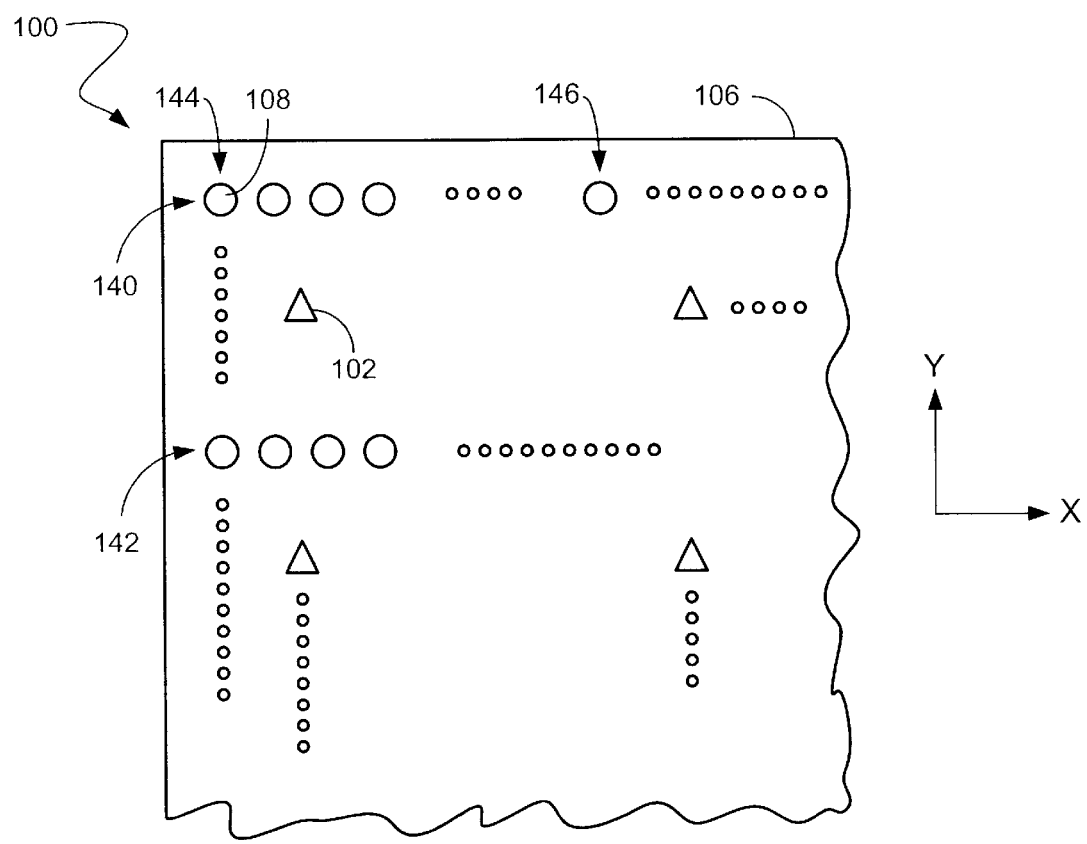

FIG. 2B shows a top view of the ARS device 100 and illustrates a two-dimensional array of storage areas 108 and a two-dimensional array of emitters 102. To reduce the number of external circuits, the storage medium 106 can be separated into rows, such as row 140, where each row contains a number of storage areas 108 such that each emitter 102 is responsible for a number of rows. However, in such an embodiment, each emitter 102 need not be responsible for entire length of the rows. Instead, the emitter 102 can be responsible for the storage areas 108 within rows 140 through 142, and within the columns 144 through 146. All rows of storage areas accessed by one emitter 102 typically are connected to one external circuit, for example, rows 140 through 142. To address a storage area 108, the emitter 102 responsible for that storage area 108 is activated and is displaced with the micromover 110 to that storage area 108.

Figure 2C:
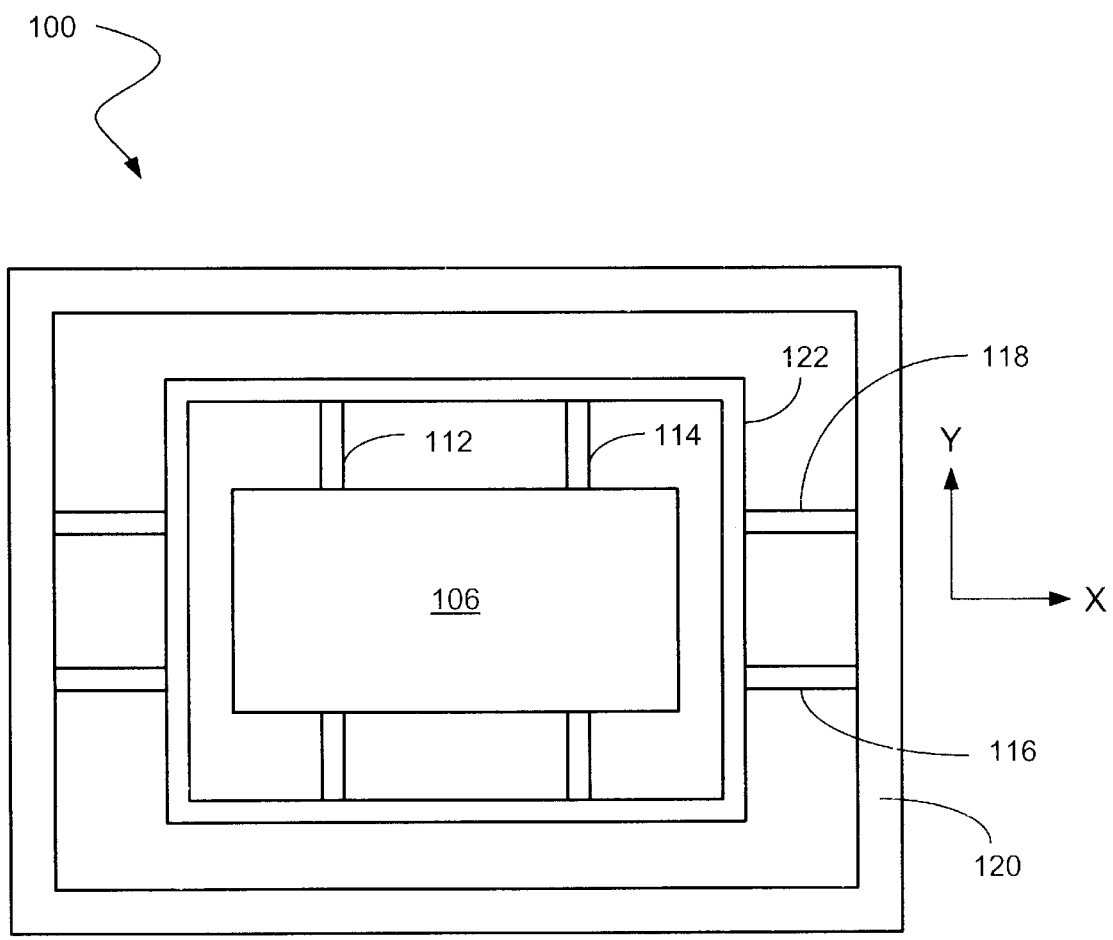

FIG. 2C shows a top view of the cross-section A—A of FIG. 2A and illustrates the storage medium 106 being held by two sets of thin-walled microfabricated beams 112–118. The faces of the first set of thin-walled beams are in the X-Z plane, such as 112 and 114. This set of beams may be flexed in the X direction allowing the medium 106 to move in the X direction with respect to the casing 120. The faces of the second set of thin-walled beams are in the X-Z plane, such as 116 and 118. This set of beams allows the medium to move in the Y direction with respect to the casing 120. The storage medium 106 is held by the first set of beams 112, 114, which is connected to a frame 122. The frame is held by the second set of beams 116, 118, which is connected to the casing 120. The field emitters 102 scan over the storage medium 106, or the storage medium 106 scans over the field emitters 102, in the X-Y directions by electrostatic, electromagnetic, or piezoelectric means known in the art.

In use, writing is accomplished by temporarily increasing the power density of the electron beam current to modify the surface state of the storage area 108. Reading, on the other hand, is accomplished by observing the effect of the storage area 108 on the electron beams, or the effect of the electron beams on the storage area 108. Reading is typically accomplished by collecting the secondary and/or backscattered electrons when an electron beam with a lower power density is applied to the storage medium 106. During reading, the power density of the electron beam is kept low enough so that no further writing occurs. One preferred embodiment of the storage medium 106 is a material whose structural state can be changed from crystalline to amorphous by electron beams. The amorphous state has a different SEEC and BEC than the crystalline state. This leads to a different number of secondary and backscattered electrons emitted from the storage area 108. By measuring the number of secondary and backscattered electrons, the state of the storage area 108 can be determined. To change from the amorphous to the crystalline state, the beam power density can be increased and then slowly decreased. This increase/decrease heats the amorphous area and then slowly cools it so that the area has time to anneal into its crystalline state. To change from the crystalline to amorphous state, the beam power density is increased to a high level and then rapidly decreased. An example of one such type of material is germanium telluride (GeTe) and ternary alloys based on GeTe.

FIG. 3 schematically illustrates a field of emitters 102 reading from the storage medium 106. In this figure, the state of one storage area 150 has been altered, while the state of another storage area 108 has not. When electrons bombard a storage area 108, both the secondary electrons and back-scattered electrons are collected by the electron collectors, such as 152. An area that has been modified will produce a different number of secondary electrons and backscattered electrons, as compared to an area that has not been modified. The difference may be greater or lesser depending upon the type of material and the type of modification made. By monitoring the magnitude of the signal current collected by the electron collectors 152, the state of and, in turn, the bit stored in the storage area can be identified.

FIG. 4 illustrates a diode approach for construction of the ARS device 100. In this approach, the storage medium 106 is based on a diode structure 200, which can be a PN junction, a schottky, barrier, or any other type of electronic valve. Although FIG. 4 illustrates a particular external circuit 202, it will be appreciated that this circuit is provided for purposes of example only. The basic idea is to store bits by locally altering the surface of a diode in such a way that collection efficiency for minority carriers generated by the altered region is different from that of an unaltered region. The collection efficiency for minority carriers is defined as the fraction of minority carriers generated by the instant electrons which are swept across the diode junction 204 when it is biased by an external circuit 202 to cause a signal current 206 to flow in the external circuit 202. In use, the field emitters 102 emit narrow beams 156 of electrons onto the surface of the diode 200. The incident electrons excite electron-hole pairs near the surface of the diode 200. Because the diode 200 is reverse-biased by the external circuit 202, the minority carriers that are generated by the incident electrons are swept toward the diode junction 204. Electrons that reach the PN junction 204 are then swept across the junction 204. Accordingly, minority carriers that do not recombine with majority carriers before reaching the junction are swept across the junction, causing a current flow in the external circuit 202.

Writing onto the diode 200 is accomplished by increasing the power density of the electron beam enough to locally alter the physical properties of the diode 200. This alteration affects the number of minority carriers swept across the junction 204 when the same area is radiated with a lower power density read electron beam. For instance, the recombination rate in a written area 250 could be increased relative to an unwritten area 108 so that the minority carriers generated in the written area 250 have an increased probability of recombining with minority carriers before they have a chance to reach and cross the junction 204. Hence, a smaller current flows in the external circuit 202 when the read electron beam is incident upon a written area 250 than when it is incident upon an unwritten area 208. Conversely, it is also possible to start with a diode structure having a high recombination rate and to write bits by locally reducing the recombination rate. The magnitude of the current resulting from the minority carriers depends upon the state of the storage area 106 and the current continues the output signal 206 to indicate the bit stored.

Figure 5:
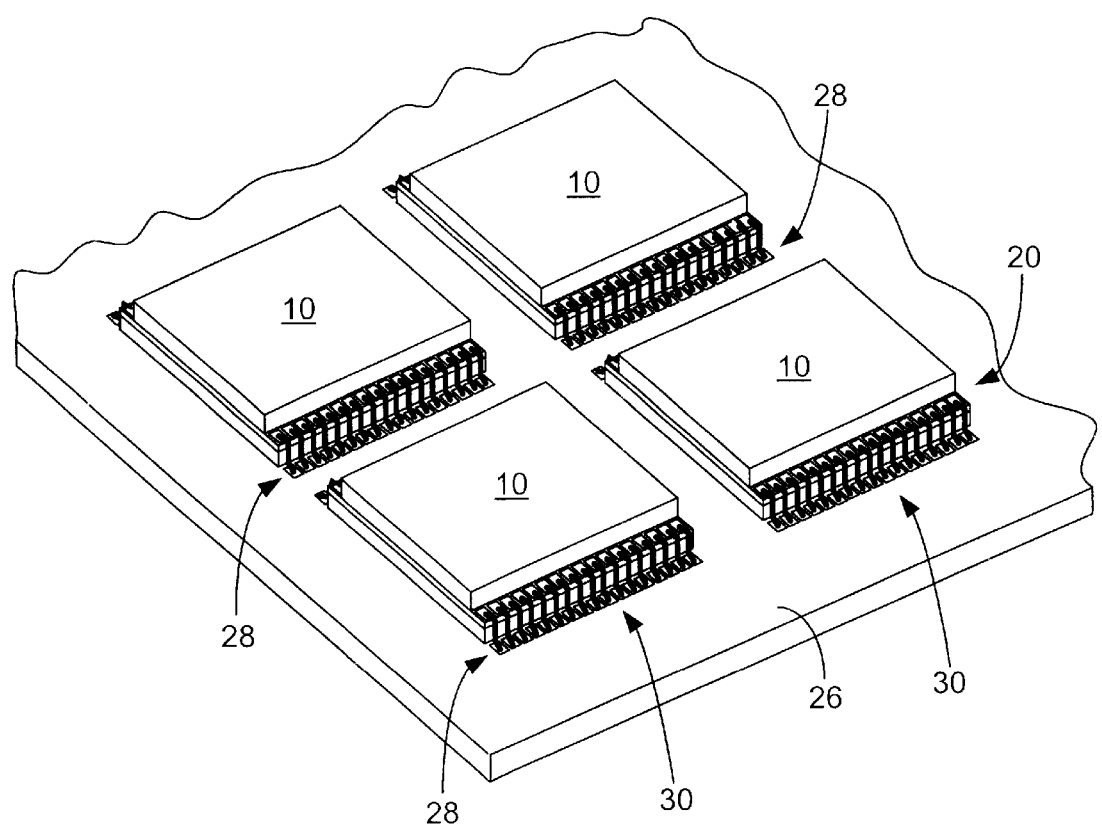
FIG. 5 is a perspective view of a first connection arrangement for the electrical device shown in FIG. 1.

An example construction of the electrical device 10 having been provided above, a first connection arrangement will now be discussed with reference to FIG. 5. As indicated in this figure, one or more electrical devices 10 can be mounted to a PCB 26 in the first connection arrangement. The PCB 26 includes a plurality of contacts 28 (e.g., contact pads) formed thereon that can be electrically connected with the various contact terminals 24 of the electrical device 10. Although a particular contact arrangement is shown in FIG. 5, it is to be understood that these contacts are shown only for purposes of example. In the first connection arrangement, electrical connections are made through a plurality of conductor members 30. By way of example, these conductor members 30 can comprise bond wires that are formed with wire bonding techniques. As indicated in FIG. 5, each of the conductor members 30 extends from a particular contact terminal 24 provided on the ledges 20 of the electrical device 10, extends down the side of the device, and connects to a particular contact 28 provided on the surface of the PCB 26. Although each of the conductor members 30 is shown extending downwardly from the electrical devices 10 in the same parallel direction, it is to be understood that the orientation of the conductor members depends upon the location of the contacts 28 provided on the PCB 26 and the location of the memory devices relative to the PCB.

Figure 6:
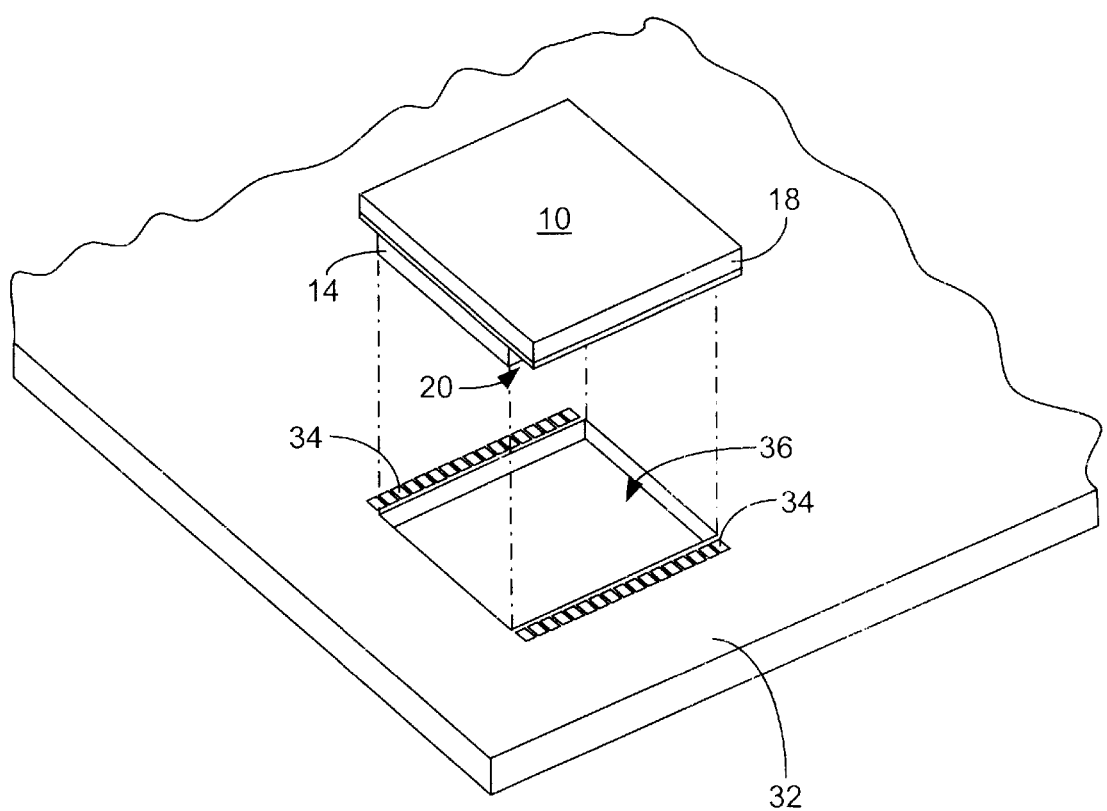
FIG. 6 is a perspective view of a second connection arrangement for the electrical device shown in FIG. 1.

FIG. 6 illustrates a second connection arrangement for the electrical device 10. As indicated in this figure, the electrical device 10 is inverted (relative to the orientation shown in FIG. 5) prior to connection such that the top layer 14 of the device faces the PCB 32. In the second connection arrangement, the PCB 32 includes at least one recess or cavity 36 that is adapted to receive the electrical device 10. As with the arrangement shown in FIG. 5, the PCB 32 includes a plurality of contacts 34 that are adapted to electrically connect with the contact terminals 24 (FIG. 1) of the electrical device 10.

Where the electrical device 10 is arranged such that one or more outer layers of the device are smaller in area than other adjacent layers so as to form one or more ledges, the cavity 36 is sized and configured to receive the relatively small layer(s) so that the ledge(s) makes contact with the surface of the PCB 32. For instance, where the electrical device 10 has a relatively small top layer 14 as shown in FIG. 1, the cavity 36 is sized and configured to receive the top layer such that the ledges 20 contact the PCB 32. With such an arrangement, the various contact terminals 24 (FIG. 1) of the electrical device 10 are positioned in direct opposition to the contacts 34 of the PCB 32.

Figure 7:
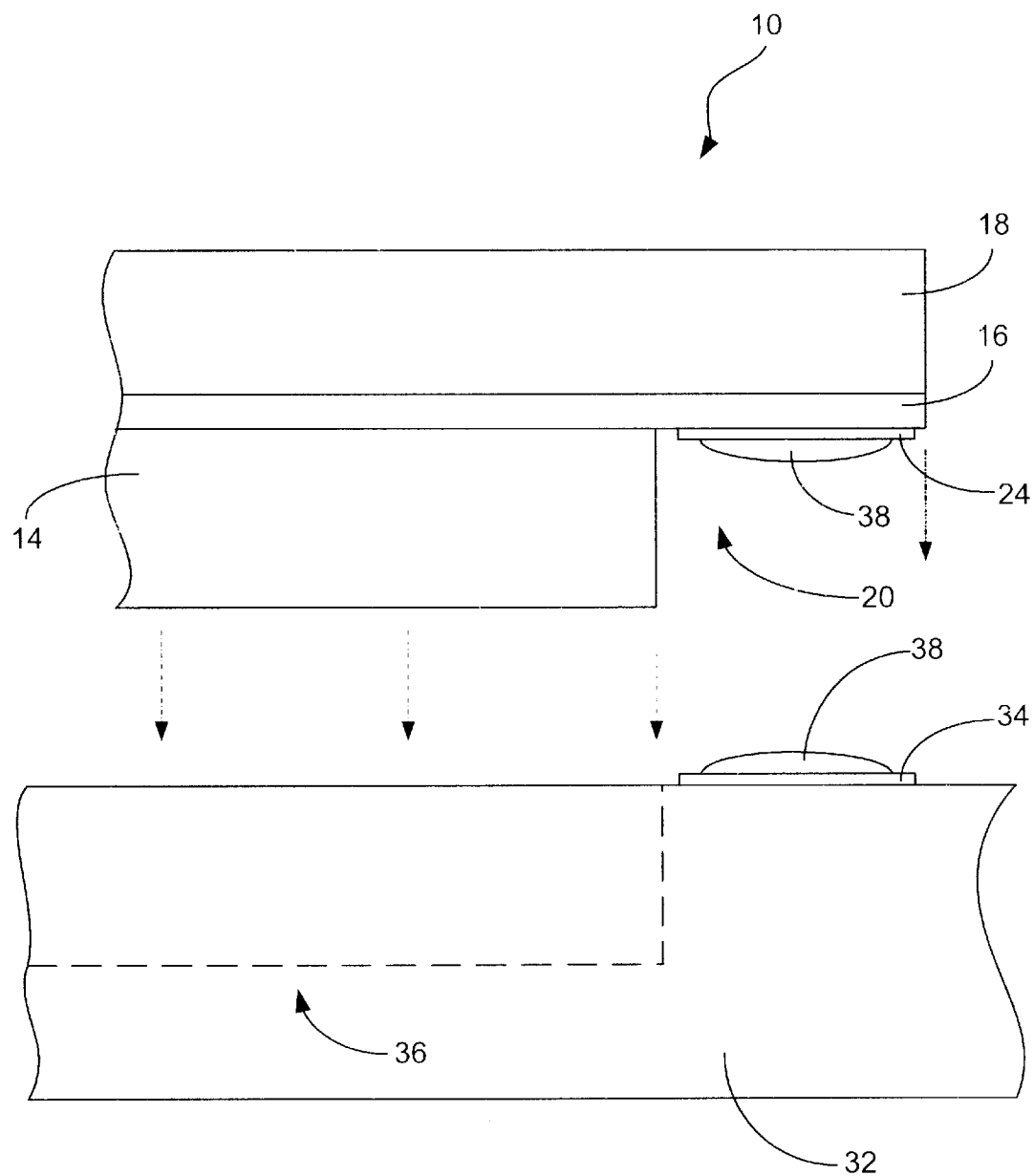
FIG. 7 is a partial side view illustrating mounting of an electrical device according to the connection arrangement of FIG. 6.

FIG. 7 illustrates mounting of the electrical device 10 to the PCB 32 in detail. As indicated in this figure, a conductive material 38 typically is used to affix the electrical device 10 to the PCB 32 and to facilitate electrical connection between the contact terminals 24 and the contacts 34. By way of example, each of the contact terminals 24 and contacts 34 that are to be connected to each other can be provided with a daub of the conductive material 38 prior to placing the electrical device 10 into its cavity 36. Although various conductive materials 38 can be used, this material typically comprises a solder material or an electrically conductive adhesive material. Where a solder material is used, daubs of solder material can be disposed on the contact terminals 24 and/or the contacts 34 through conventional soldering techniques.

Once daubs of solder have hardened, the electrical device 10 is placed into position on the PCB 32 and the assembly is exposed to an elevated temperature to cause the solder daubs to reflow so as to blend with each other and form positive electrical contact between the contact terminals 24 and contacts 34. Where the conductive material comprises an adhesive material, liquid daubs of adhesive material are provided on the contact terminals 24 and/or contacts 34 prior to connection. After the electrical device 10 is placed in position, the adhesive material cures to form positive electrical contact between the contact terminals 24 and contacts 34. Normally, curing occurs naturally with time, although it will be appreciated that other curing procedures may be applicable.

While particular embodiments of the invention have been disclosed in detail in the foregoing description and drawings for purposes of example, it will be understood by those skilled in the art that variations and modifications thereof can be made without departing from the scope of the invention as set forth in the following claims. For instance, although emphasis has been placed on connection of an ARS device, it is to be understood that the techniques disclosed herein are applicable to manifold electrical devices. In addition, although the various connection arrangements disclosed herein are described as being used in lieu of each other, it will be appreciated that these connection techniques can be combined, if desired.

What is claimed is:

1. A method for connecting an electrical device to an electrical component, the electrical device comprising at least one ledge on which is provided a plurality of contact terminals, each of the contact terminals being spaced from other of the contract terminals, the method comprising:

orienting the electrical device such that at least one of the contact terminals located on the ledge faces the electrical component;

aligning a portion of the electrical device facing the electrical component with a cavity formed in the electrical component; and inserting the portion of the electrical device facing the electrical component into the cavity so that at least one of the contact terminals makes electrical contact with a contact of the electrical device.

2. The method of claim 1, wherein the electrical device is inverted when its ledge faces the electrical component.

3. The method of claim 1, wherein:

the electrical component is a PCB, the PCB having an outer surface;

the cavity is defined by a periphery defined by the outer surface of the PCB; and the contact is located on the outer surface of the PCB.

4. The method of claim 3, wherein:

the portion of the electrical device facing the electrical component comprises a top layer of the electrical device;

the at least one of the contact terminals is spaced from the top layer of the electrical device; and when the portion of the electrical device facing the electrical component is inserted into the cavity, the at least one contact terminal is located outside the cavity.

5. The method of claim 4, wherein the cavity is sized and configured to receive the entire top layer.

6. The method of claim 1, wherein the electrical device is affixed in place with a solder material.

7. The method of claim 1, wherein the electrical device is affixed in place with an electrically conductive adhesive material.

8. The method of claim 1, wherein the electrical device is an ARS device.

* * * * *